(12) United States Patent
Palfenier et al.

(10) Patent No.: US 6,424,144 B1
(45) Date of Patent: Jul. 23, 2002

(54) VEHICLE VARIABLE RELUCTANCE SENSOR

(75) Inventors: Samuel Roland Palfenier, El Paso, TX (US); Cecilia Hernandez, CD. Juarez Chih (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/540,027

(22) Filed: Mar. 31, 2000

(51) Int. Cl.[7] ................................................. G01P 3/44
(52) U.S. Cl. ........................ 324/174; 324/173; 324/166
(58) Field of Search ........................... 324/207.15, 166, 324/173, 174, 207.16, 207.25; 336/180, 192; 310/168

(56) References Cited

U.S. PATENT DOCUMENTS 5,097,169 A * 3/1992 Fukushima .................. 310/263
5,659,246 A * 8/1997 Togo et al. ............. 264/272.15
5,689,182 A * 11/1997 Togo et al. ............. 324/207.15
5,998,988 A * 12/1999 Dickmeyer et al. ......... 324/174

* cited by examiner

*Primary Examiner*—Jay Patidar
(74) *Attorney, Agent, or Firm*—Margaret A. Dobrowitsky

(57) ABSTRACT

A vehicle variable reluctance sensor includes a hollow generally cylindrical sensor housing with an open proximal end. Within the interior of the sensor housing is a coil wound around a "T"-shaped spool. The coil is connected to two electrical terminals by two electrical leads. A channel is formed in the spool between the coil and the electrical leads and the electrical leads are disposed within the channel. The channel is flanked on each side by a lip that extends outwardly from the spool. If the electrical leads become slack under extreme temperatures, the configuration of the channel, in conjunction with the lips, prevents the electrical leads from coming out of the channel and unwinding the coil. As such, it is not necessary to tape the coil or otherwise immerse the coil in varnish to prevent the coil from unwinding.

14 Claims, 1 Drawing Sheet

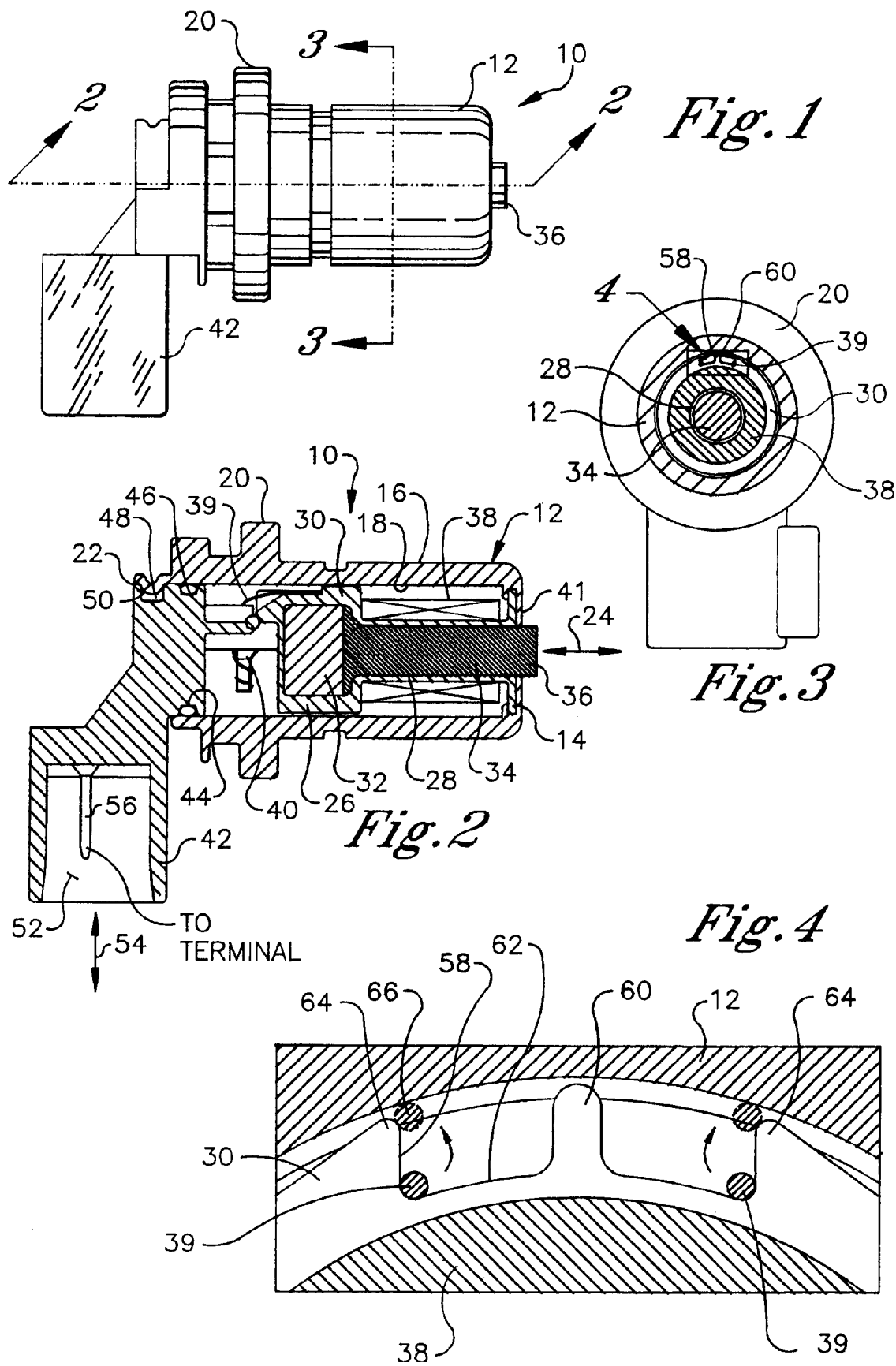

VEHICLE VARIABLE RELUCTANCE SENSOR

TECHNICAL FIELD

The present invention relates to motor vehicle variable reluctance sensors.

BACKGROUND OF THE INVENTION

Transmission-mounted variable reluctance sensors have been provided to sense the speed of a vehicle. Some variable reluctance sensors have electromagnetic sensing structures that include a thin wire wound around a post to create a coil. The ends of the thin wire are routed along the body of the sensing structure to a pair of terminals to which they are soldered. Typically the coil is taped or immersed in varnish so that the ends of the wire do not come loose and unwind when exposed to extreme temperatures. The extra process step to tape the ends of the coil or immerse the coil in varnish consumes time and increases costs.

Accordingly, the present invention recognizes the need for a variable reluctance sensor in which the ends of the coil are routed through the body of the sensor in such a manner that minimizes manufacturing time and costs.

SUMMARY OF THE INVENTION

A vehicle sensor includes a sensing structure that is disposed within a sensor housing. The sensing structure includes a thin wire wound around a spool to form a coil and at least two electrical leads extending from the coil. In accordance with the present invention, the spool is formed with a channel that is at least partially flanked on each side by a lip. The lips prevent the electrical leads that are disposed within the channel from slipping out of the channel between the spool and the housing and unwinding the coil.

In a preferred embodiment, the channel includes a base surface that has a partially cylindrical contour and at least two outer corners. Accordingly, the contour of the base surface urges the electrical leads into respective outer corners of the channel. Preferably, the channel includes a divider extending at least partially along the length of the channel. Also, in a preferred embodiment, the sensor includes a connector housing coupled to the sensor housing. A connector is supported by the connector housing and is electrically coupled to terminals that are, in turn, connected to the leads. Additionally, the connector housing forms a socket around the connector and the socket is sized to engage a complementarily-shaped and sized electrical connector. Preferably, the connector housing defines a first axis, the sensor housing defines a second axis, and the axes are orthogonal to each other. The sensor housing also includes an outer wall that has an abutment flange to abut a transmission housing.

In another aspect of the present invention, a vehicle sensor includes a sensor housing, a coil that is disposed within the housing, and at least two electrical leads extending from and connected to the coil. In this aspect of the present invention, the leads are disposed in a raceway that is configured for preventing the electrical leads from coming loose from the sensing structure and unwinding the coil.

The present invention will now be described, by way of example, with reference to the accompanying drawings, in which:

BRIEF DESCRIPTION OF THE DRAWINGS

FIG. 1 is a side plan view of the sensor;

FIG. 2 is a cross-sectional view of the sensor along line 2—2 in FIG. 1;

FIG. 3 is a partial cross-sectional view along line 3—3 in FIG. 1; and

FIG. 4 is a detail view as seen as indicated by the box 4 in FIG. 3.

DESCRIPTION OF AN EMBODIMENT OF THE INVENTION

Referring initially to FIG. 1, a vehicle variable reluctance (VR) sensor is shown and generally designated 10. FIGS. 1 and 2 show that the VR sensor 10 includes a metal, or more preferably, a plastic hollow generally cylindrical sensor housing 12 having an open distal end 14. The sensor housing 12 defines an outer wall 16 and an interior surface 18, and an abutment flange 20 is formed on the outer wall 16 to abut a transmission housing, with the open distal end 14 being disposed within the transmission housing in contact with transmission fluid. Opposite the open distal end 14, the sensor housing 12 is formed with an open proximal end 22, with a sensor housing axis 24 being defined between the ends 14, 22.

As shown in FIG. 2, a hollow plastic generally "T"-shaped spool 26 is disposed within the sensor housing 12. As shown, the spool 26 includes a hollow cylindrical pole piece holder 28 that terminates at its proximal end in an enlarged magnet holder 30. Preferably, the pole piece holder 28 is integrally formed with the connector housing, discussed below. Sensing structure, including a magnet 32, fills the magnet holder 30 and an elongated pole piece 34 fills the pole piece holder 28 as shown. The magnet 32 is magnetically coupled to the pole piece 34, and the magnet 32 preferably contacts the pole piece 34. If desired, a distal segment 36 of the pole piece 34 can extend beyond the distal end 14 of the sensor housing 12.

FIG. 2 also shows that the sensing structure of the sensor 10 includes a hollow toroidal coil 38 of wire that closely surrounds the pole piece holder 28 of the spool 26. When energized, the coil 38 is magnetically coupled to the pole piece 34/magnet 32. One or more electrical leads 39 connect the coil 38 to terminals 40. Additionally, a hollow disk-shaped sealing ring 41 extends radially outward from the distal end of the pole piece holder 28 and contacts the housing 12 to establish a seal therebetween. The coil 38 is ensconced behind (i.e., proximal) to the sealing ring 41, and thus, is protected from transmission fluid. With this structure, the pole piece 34 can be, e.g., coupled to a rotating component of a vehicle transmission, with an electric current that is representative of the speed of rotation accordingly being generated in the coil 38.

Additionally, a metal, or more preferably, a plastic connector housing 42 is coupled to the sensor housing 12. In a preferred embodiment, the connector housing is held within the proximal end 22 of the sensor housing 12 as shown. If desired, the connector housing 42 can be circumscribed by an o-ring groove 44, and an o-ring 46 can be disposed within the groove 44 to establish a seal between the housings 12, 42.

Still referring to FIG. 2, the connector housing 42 is formed with an engagement groove 48 and the sensor housing 12 is formed with an inwardly curved engagement rib 50 that is received within the groove 48. At the junction of the groove 48 and the engagement rib 50, the housings 12, 42 can be heat-staked together to hold the housings 12, 42 together. Moreover, the connector housing 42 defines a hollow socket 52, and the socket 52 establishes an axis 54 that is orthogonal to the axis 24 of the sensor housing 12. One or more connectors, such as a pin 56, are supported within the socket 52, it being understood that the pin 56 is electrically connected to the terminals 40 and hence, to the coil 38. The socket 52 is configured for engaging a complementarily-shaped connector (not shown) of a vehicle instrumentation system, for receiving the signal from the coil 38.

Having described the overall structure of the sensor 10, attention is now directed to FIGS. 3 and 4, which show the means by which the electrical leads 39 are routed along the magnet holder 30 to the terminals 40. FIGS. 3 and 4 show that the magnet holder 30 is formed with channel 58 having a divider 60 that separates the channel 58 into two electrical lead raceways. As best shown in FIG. 4, the channel 58 includes a base surface 62 having a curved, preferably partially cylindrical contour that mirrors the generally cylindrical shape of the sensor 10. The electrical leads 39 are routed through the channel 58 with each lead 39 being separated from the other by the divider 60. The cylindrical contour of the base surface 62 force each electrical leads 39 into a respective outer corner of the channel 58.

As further shown in FIG. 4, the magnet holder 30 extends outwardly along each side of the channel 58 to form a lip 64 on each side of the channel 58. Accordingly, the lips 64 reduce the clearance between the magnet holder 30 and the sensor housing 12 along the channel 58 to a dimension that preferably is less than the diameter of each electrical lead 39, as illustrated by phantom lead symbols 66. If the electrical leads 39 develop any slack over time, this configuration prevents the electrical leads 39 from slipping between the magnetic holder 30 and the sensor housing 12 and as such, helps prevent the coil 38 from unwinding.

With the configuration of structure described above, it is to be appreciated that the vehicle VR sensor 10 provides a means for routing the electrical leads 39 from the coil 38 to the terminals 40 that will help prevent the coil 38 from unwinding if the electrical leads 39 develop any slack. As such, the coil 38 does not need to be taped or otherwise immersed in varnish to prevent the coil 38 from unwinding. This eliminates a step in the manufacturing process and reduces costs and saves time. Moreover, the quality of the sensor 10 is improved by reducing the handling of the fine wire that makes up coil 38 during manufacturing.

While the particular vehicle variable reluctance sensor as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A vehicle sensor comprising:
   a sensor housing; and
   a sensing structure disposed within the sensor housing, the sensing structure including a thin wire around a spool to form a coil, at least two electrical leads extending from the coil, the spool being formed with a channel at least partially flanked on each side by a raised lip, the lips preventing the electrical leads disposed in the channel from slipping out of the channel between the spool and the housing and unwinding the coil.

2. The vehicle sensor of claim 1, wherein the channel further includes a base surface having a partially cylindrical contour and at least two outer corners, the contour of the base surface urging the electrical leads into respective outer corners of the channel.

3. The vehicle sensor of claim 2, wherein the channel further includes a divider extending at least partially along the length of the channel.

4. The vehicle sensor of claim 3, further including a connector housing coupled to the sensor housing, and a connector supported by the connector housing, the connector being electrically coupled to terminals, the terminals being connected to the leads.

5. The vehicle sensor of claim 4, wherein the connector housing forms a socket round the connector, the socket being sized to engage a complementarily-shaped and sized electrical plug.

6. The vehicle sensor of claim 4, wherein the connector housing defines a first axis and the sensor housing defines a second axis, the axes being orthogonal to each other.

7. The vehicle sensor of claim 1, wherein the sensor housing further includes an outer wall having an abutment flange to abut a transmission housing.

8. A vehicle sensor comprising:
   a sensor housing;
   a coil disposed within the housing; and
   at least two electrical leads extending from and configured to the coil, the leads being disposed in a raceway configured for preventing the electrical leads from coming loose and unwinding the coil, the coil comprises a thin wire wound around a spool and the raceway comprises a channel formed at least partially along the length of the spool between the coil and at least two terminals, the channel being flanked on each side by a raised lip extending at least partially along the length of the channel, and the electrical leads being disposed within the channel.

9. The vehicle sensor of claim 8, wherein the channel further includes a base surface having a partially cylindrical contour and at least two outer corners, the contour of the base surface urging the electrical leads into respective outer corners of the channel.

10. The vehicle sensor of claim 9, wherein the channel further includes a divider extending at least partially along the length of the channel.

11. The vehicle sensor of claim 10, further including a connector housing coupled to the sensor housing, and a connector supported by the connector housing, the connector being electrically coupled to terminals, the terminals being connected to the leads.

12. The vehicle sensor of claim 11, wherein the connector housing forms a socket around the connector, the socket being sized to engage a complementarily-shaped and sized electrical connector.

13. The vehicle sensor of claim 12, wherein the connector housing defines a first axis and the sensor housing defines a second axis, the axes being orthogonal to each other.

14. The vehicle sensor of claim 8, wherein the sensor housing further includes an outer wall having an abutment flange to abut a transmission housing.

* * * * *